United States Patent [19]

McCord

[11] Patent Number: 4,537,660
[45] Date of Patent: Aug. 27, 1985

[54] VAPOR GENERATING AND RECOVERING APPARATUS

[76] Inventor: James W. McCord, 9101 Nottingham Pkwy., Louisville, Ky. 40222

[21] Appl. No.: 355,668

[22] Filed: Mar. 8, 1982

Related U.S. Application Data

[63] Continuation-in-part of Ser. No. 919,978, Jun. 28, 1978, abandoned.

[51] Int. Cl.³ .................... B01D 3/02; F25B 41/00
[52] U.S. Cl. ......................... 202/170; 202/186; 202/206; 62/183; 62/199; 62/238.5; 62/238.6; 203/26; 203/100; 203/DIG. 4; 203/DIG. 7; 134/109
[58] Field of Search ............... 62/238.6, 511, 183, 62/199; 202/170, 160, 186, 173, 206; 134/90, 105, 107–109, 110, 112, 10–12, 56 R; 203/2, DIG. 4, DIG. 7, 100, 26

[56] References Cited

U.S. PATENT DOCUMENTS

| | | | |
|---|---|---|---|
| 2,816,065 | 12/1957 | Legler | 202/170 |
| 3,070,463 | 12/1962 | Barday | 202/170 X |
| 3,188,829 | 6/1965 | Siewert et al. | 62/238.6 X |
| 3,238,065 | 3/1966 | Fullhart | 202/170 X |
| 3,375,177 | 3/1968 | Rand | 202/170 X |
| 3,471,372 | 10/1969 | Dunn | 202/170 X |
| 3,989,183 | 11/1976 | Gustafsson | 62/238.6 X |
| 4,003,798 | 1/1977 | McCord | 202/170 X |
| 4,081,971 | 4/1978 | Eber | 62/511 X |

Primary Examiner—Wilbur Bascomb
Attorney, Agent, or Firm—Charles G. Lamb

[57] ABSTRACT

A vapor generating and recovering apparatus for vaporizing a liquid and condensing a vapor, the apparatus including a container having a liquid therein with a heating and cooling system in heat transfer relation with the liquid and vapor in the container. The heating and cooling system includes means to vaporize the liquid; means to condense the vaporized liquid; and, means to compress a refrigerant. The means to compress the refrigerant is in fluid communication on its high pressure side with the means to vaporize a liquid or heat a liquid and on its low pressure side with the means to condense or cool a liquid. The heating and cooling system further includes a complementary condenser system on the high pressure side of the means to compress a refrigerant, discharging its heat external to said apparatus and pump down valve means selectively closeable so that refrigerant can be pumped out of the means to compress a refrigerant.

41 Claims, 7 Drawing Figures

VAPOR GENERATING AND RECOVERING APPARATUS

CROSS REFERENCE TO RELATED APPLICATION

This is a continuation-in-part of my co-pending application entitled "VAPOR GENERATING AND RECOVERING APPARATUS" filed June 28, 1978, Ser. No. 919,978 and now abandoned.

BACKGROUND OF THE INVENTION

This invention relates to a vapor generating and recovering apparatus for vaporizing a liquid and condensing a vapor and more particularly relates to an improved apparatus for vaporizing a liquid and condensing a vapor in combination with a heating and cooling system.

In the present state of the art, vapor generating and recovering devices for vaporizing and condensing a liquid are utilized in many different areas. For example, in the cleaning of objects such as metallic tools, plastic parts, and the like, hot or boiling solvents have been utilized to remove undesirable soluble and particulate matter from these tools, parts, and the like by immersing the soiled object into hot or boiling solvent. In bringing the solvent to a boiling temperature, a solvent vapor zone is created above the boiling solvent solution in the tank or chamber in which objects may be placed for cleaning. The vaporized solvent is then subjected to cooling or condensing means and is recovered. Generally, the chamber or tank from which the solvent is vaporized is filtered or processed by other means to remove the contaminants therefrom and then reused.

One example of a heating and cooling system which is utilized in the prior art is described in U.S. Pat. No. 4,003,798. However, this system is specifically directed for use with an apparatus including separate vaporizing and condensing chambers and the liquid to be vaporized includes at least two components therein and must use a bypass system.

SUMMARY OF THE INVENTION

It has now been found that a vapor generating and recovering apparatus for vaporizing a liquid and then condensing the vaporized liquid in the cleaning of objects, the cleaning can be accomplished by the utilization of a heating and cooling system which utilizes substantially all of the energy supplied to a refrigeration system with little or no waste wherein at least one chamber is utilized for both vaporization and condensation, and the liquid may be a single component, which is, if used in a cleaning, reclamation, or developing application, a liquid solvent of a low molecular weight halogenated hydrocarbon, such as, for example, trichloromonoflouromethane, methylene chloride, trichlorotrifluoroethane, and the like.

In the present invention, the heating and cooling system includes a refrigerant compressor, a main refrigerant condenser, a complementary condenser, expansion means, a refrigerant evaporator, and pump down valve means. The main refrigerant condenser is in heat transfer relation with means to vaporize a liquid and the main refrigerant evaporator is in heat transfer relation with means to condense a vaporized liquid. The pump down valve means is selectively closed so that refrigerant can be pumped out of the compressor for storage elsewhere in the system when the compressor is inoperative. Preferably, the pump down valve means is in the liquid side of the heating and cooling system and is usually between the main refrigerant condenser and the expansion means.

In the heating and cooling system more energy is available to this system as heat due to the motor input energy and the motor inefficiencies of the refrigeration system and must be removed. Some of this heat is removed by radiant energy loss, by conduction of heat through the apparatus, and by heat absorbed by the parts being processed. There are occasions where these techniques of heat rejection are not sufficient to totally balance the system. This excess energy removal is accomplished in this system by the use of a complementary condenser utilized to remove this excess heat. This complementary condenser may be placed before the main condenser, after the main condenser, or in parallel with the main condenser depending on the given application. The complementary condenser dissipates heat energy by an externally cooled water, air or refrigerant device. The mechanism of cooling is done automatically by a thermostatic or pressure control device. The pressure device generally monitors the head pressure and thereby automatically adjusts the cooling mechanism. The thermostatic control device generally senses the vapor level in the apparatus in such a manner that ambient conditions do not affect its operation. In the case of an air cooled complementary condenser the thermostatic sensor or pressure sensor varies the fan speed. In the case of a water cooled complementary condenser the flow of water is adjusted automatically to remove only the unused energy by again sensing the vapor or pressure rise. A water control valve may be located on the input or output water line of the complementary condenser. The air cooled complementary condenser should also be located in such a manner that ambient conditions and a conventional cooling of the condenser do not remove excessive amounts of heat. In general, this unit is located on a plane other than the shelf mounting the refrigeration compressor.

When more than one chamber is utilized for vaporizing or heating a liquid and then condensing the vaporized liquid, the main condenser may either be placed in series or in parallel with other chambers to provide heat emitting requirements. The solution in other chambers may boil or be heated below the boiling point.

The condensed liquid refrigerant then passes through an expansion valve whereby the temperature and pressure and dropped and the refrigerant liquid passes into the evaporator which is utilized in the recovery portion of the apparatus. In the evaporator portion of the refrigeration system where the cold liquid refrigerant evaporates to a gas, the evaporator becomes the condenser for the vaporized liquid. In the evaporator part of the heating and cooling system there are possibly several additional areas where cooling may be employed to meet operating requirements. One such area employs an expansion valve to control the flow and capacity of refrigerant to a sub-cooling coil in a water separator to control the cooling capacity within the water separator. The main purpose of this unit is to sub-cool the liquid sufficiently to control the temperature in the cool liquid sump of the vapor recovery portion of the apparatus and to improve water separation. Another such expansion valve may be utilized to control refrigerant capacity to a convection control mechanism on the apparatus to eliminate the convection of vapor up the side walls of the apparatus. Preferably, a peripheral coil is wrapped around the outer portion of the apparatus several inches above the saturated vapor line to cool the metal and provide a temperature barrier. The ability to raise the pressure and temperature in this evaporator line allows the temperature to be above the atmospheric dew point and minimize the introduction of condensed water to the apparatus. Additional evaporators may be employed for temperature control to liquid chambers in the above apparatus as required in a similar manner to those previously described. In, for example, a solvent recovery chamber which contains the main evaporator also provides for a control of vapor movement by the evaporator's low temperature and by the pressure drop experienced within this chamber that a change of phase of vapor to liquid. This technique minimizes the use of solvent in such a device. The refrigerant is then returned to the compressor as a low pressure low temperature gas to complete the refrigeration cycle.

One of the most unique portions of this system is the ability for this device to start without the use of supplementary heat. The refrigeration system initially starts off with only the heat of compression supplied by motor energy. Additional heat is quickly obtained from the evaporator by its ability to operate at lower temperatures during start-up. In this manner heat is drawn from the atmosphere and dissipated as heat energy in the condenser. The evaporator temperature may be limited by the pressure setting on a by-pass valve. Once the system is in complete balance and the vapor is fully condensing on the evaporator then the refrigeration system is operating effectively and efficiently. During this portion of the operation a by-passing arrangement is not in operation. If for some reason during the operation the vapor should fall below the condensing area then a by-pass system will automatically come into operation. This is all accomplished by pressure differentials in both the evaporator and condenser portions of the system. The use of a receiver and a suction accumulator are generally employed for the proper operation of the by-passing system. As indicated previously, once the vapor has been established then the system automatically adjusts itself for refrigerating effect and balances the heat and cooling cycles within the system utilizing the complementary condenser. It should also be noted that the refrigeration compressor operates in this system continuously thereby providing reliability to this mechanical portion of the apparatus.

It has also been found that with the utilization of the aforementioned type system the principles of latent energy have been incorporated. This means that the refrigerant boils in the evaporator which in turn condenses the solvent and the refrigerant liquifies in the condenser while the solvent-soil mixture boils, the solvent being vaporized therefrom. Uniform temperature is experienced throughout these portions of the system to provide for better economics in the recovery of solvents. In addition, the temperature of the refrigeration condenser unit is of reasonably low temperature and is not sufficient to decompose the solvent utilized. This provides a degree of safety experienced from this apparatus.

When the system is to be shut-down, the pump down valve means is closed while the compressor continues to operate, thus, pumping refrigerant out of the compressor for storage elsewhere in the system. When the refrigerant condition immediately upstream of the compressor reaches a predetermined temperature or pressure, the compressor shuts off.

More particularly, in a vapor generating and recovering apparatus for vaporizing a liquid and condensing a vapor, including a housing having at least one compartment therein, said compartment having a lliquid therein, the improvement comprising:

A heating and cooling system in heat transfer relation with said liquid and said vapor in said compartment, said system including a main condenser in heat emitting relation with said liquid; a main evaporator in heat absorbing relation with said vapor; a complementary condenser in heat emitting relation in said system disposed outside said compartment; and, means to compress a refrigerant, said means to compress being in fluid communication on its high pressure side with said main condenser and said complementary condenser, and on its low pressure side with said main evaporator, said system including expansion means disposed between said main condenser and said main evaporator and pump down valve means, said pump down valve means being selectively closed while said means to compress continues to operate for pumping refrigerant out of said means to compress, and means to de-actuate said means to compress at preselected refrigerant conditions.

In preferred utilization of the vapor generating and recovery devices of the present invention, specifically in relation to a vapor cleaning device, a more fully described apparatus is hereinafter discussed.

BRIEF DESCRIPTION OF THE DRAWINGS

Referring to the drawings.

DESCRIPTION OF THE PREFERRED EMBODIMENTS

Figure 1:
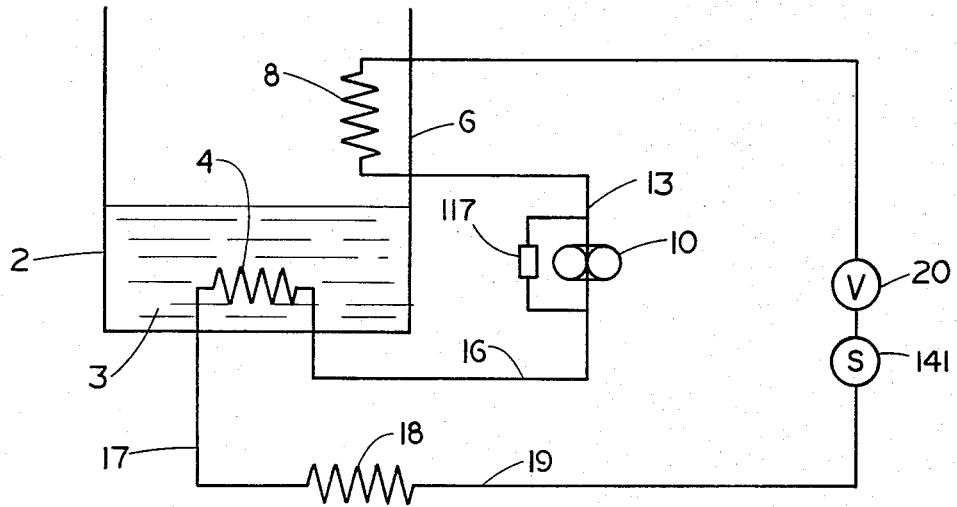
FIG. 1 is a schematic diagram of a preferred vapor generating and recovering apparatus of the present invention.

In FIG. 1, a container 2 for vaporizing a liquid 3 and then condensing the vaporized liquid is provided. Disposed along the bottom of the container 2 is a heating coil 4 which provides heat to the liquid 3, heating coil 4 being a condensing coil in a heating and cooling system to be discussed hereinafter. Coil 4 provides sufficient heat to the container 2 to boil and vaporize the liquid therein. When the liquid is a cleaning solvent, the boiling action also provides cleaning power for the solvent.

Disposed along the upper portion of wall 6 is a cooling coil 8, cooling coil 8 being generally an evaporating coil in a heating and cooling system which will be discussed hereinafter. Cooling coil 8 is provided to maintain a preselected temperature in the container below the vaporizing temperature of the liquid, such as a cleaning solvent thereby condensing the vaporized solvent and preventing the solvent from escaping the container 2. It is realized that the coil 8 may be positioned at other locations in container 2, such as around the periphery thereof, depending upon the cooling conditions and requirements needed.

In the heating and cooling system of FIG. 1, shown schematically, a main compressor 10, of the type used in refrigerating systems, compresses a suitable gaseous refrigerant which flows to the compressor 10 in a refrigerant section conduit 13. Compressor 10 compresses the suitable gaseous refrigerant, to a preselected pressure, and the pressurized hot refrigerant gas flows from the compressor 10 through conduit 16 to the heating coil 4, discussed previously, wherein the refrigerant is condensed therein and upon condensing vaporizes the liquid 3 which is disposed within container 2. The refrigerant then flows through conduit 17 through a complementary condenser 18 condensing and sub-cooling refrigerant and then through an expansion valve 20 and evaporating coil 8.

Figure 2:
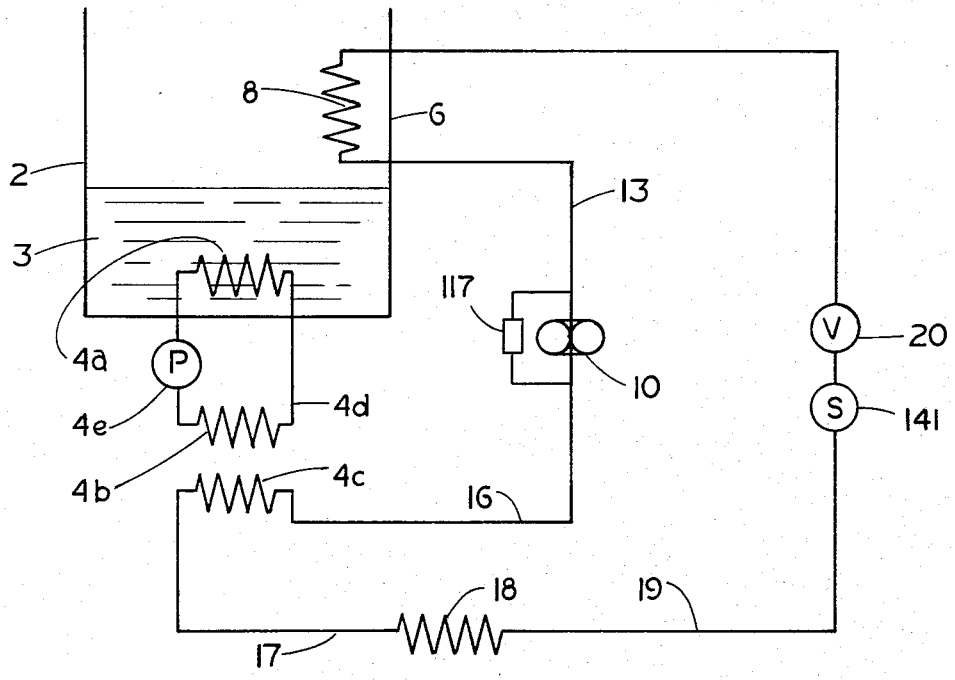
FIG. 2 is a schematic diagram showing one modification of the apparatus of FIG. 1.

In FIG. 2, the device as shown in FIG. 1 and described hereinbefore, is shown, except the means to vaporize the liquid 3 includes a separate heat transfer system. In this embodiment the heating coil 4a is connected to a heating coil 4b which is in heat transfer communication with a condensing coil 4c in a heating and cooling system as described previously. In this embodiment a heat transfer fluid is disposed to circulate through conduit 4d between heat coils 4a and 4b utilizing pump 4e, heating coil 4b receiving heat from the condensing of refrigerant in condensing coil 4c and subsequently giving up heat through heating coil 4a to the liquid 3. Water is an example of a heat transfer fluid used in the separate heat transfer system, but it is realized that other fluids may be used which are well known by those skilled in the art.

From time-to-time the vapor generating and recovery apparatus will be shut down as, for example, at the end of a work shift or for cleaning container 2. When the compressor 10 is shut off, refrigerant vapor will condense in the compressor crankcase dissolving into the compressor lubricating oil, and may even result in condensed refrigerant completely filling the compressor crankcase; thus, providing poor lubrication and slugging upon start-up. In order to minimize the condensation of refrigerant in the compressor when the compressor is shut-off, a pump down valve 141 is provided in the system; preferably, between the main condenser or heating coil 4, 4a, and the main evaporator or cooling coil 8. The pump down valve 141 is more preferably disposed upstream, relative to the flow of refrigerant, of the expansion valve 20.

A dual pressure control switch 117 is included in the embodiments of FIGS. 1 and 2. The control switch 117 is operatively connected to the compressor 10 and functions in response to a change in the refrigerant pressure on each side of the compressor 10. The dual pressure control switch 117 is utilized to respond to low and high pressures developed by the refrigerant system and is a feature utilized, in coordination with the pump down valve 141, to shut down the heating and cooling system when the system is being pumped down. However, it is realized that other pressure as well as temperature sensing and activating means may be utilized in lieu of the dual pressure control switch 117 without departing from the scope and spirit of the present invention.

In operation, when the heating and cooling system is shut down, the system is pumped down by first closing off the pump down valve 141. The compressor 10 continues to operate, thus, pumping the refrigerant out of the cooling coil 8 and out of the compressor 10 itself into the system between the compressor 10 and the pump down valve 141. It should be understood that the pump down valve 141 is closed only during the system shut down procedure, and it is opened for normal system operation.

The main condenser 4, 4a, the complementary condenser 18, or refrigerant conduits 17 and 19, or any combination thereof, can be physically sized to provide storage volume for the refrigerant pumped out of the compressor 10. Thus, the refrigerant pumped out of the compressor 10 is stored in the main condenser, complementary condenser or refrigerant lines isolating the refrigerant from the compressor when it is not operating preventing condensation of the refrigerant in the compressor crankcase. As the refrigerant is being pumped out of the compressor the dual pressure control switch 117 senses the refrigerant pressure drop at the compressor and shuts the compressor off when the refrigerant pressure reaches a predetermined condition, thus, terminating the system pump down.

In FIGS. 3–7, a container 102 for vaporizing a liquid 103 and then condensing the vaporized liquid is provided. Disposed near the bottom of the container 102 thereof is a heating coil 104 which provides heat to vaporize the liquid 103. Heating coil 104 is a condensing coil in a heating and cooling system to be discussed hereinafter.

Disposed at a preselected position in the upper portion of the container 102 is a cooling coil 108, cooling coil 108 being generally an evaporating coil in a heating and cooling system which will be discussed hereinafter. Cooling coil 108 is provided to maintain a preselected temperature in the container below the vaporizing temperature of the liquid.

Figure 3:
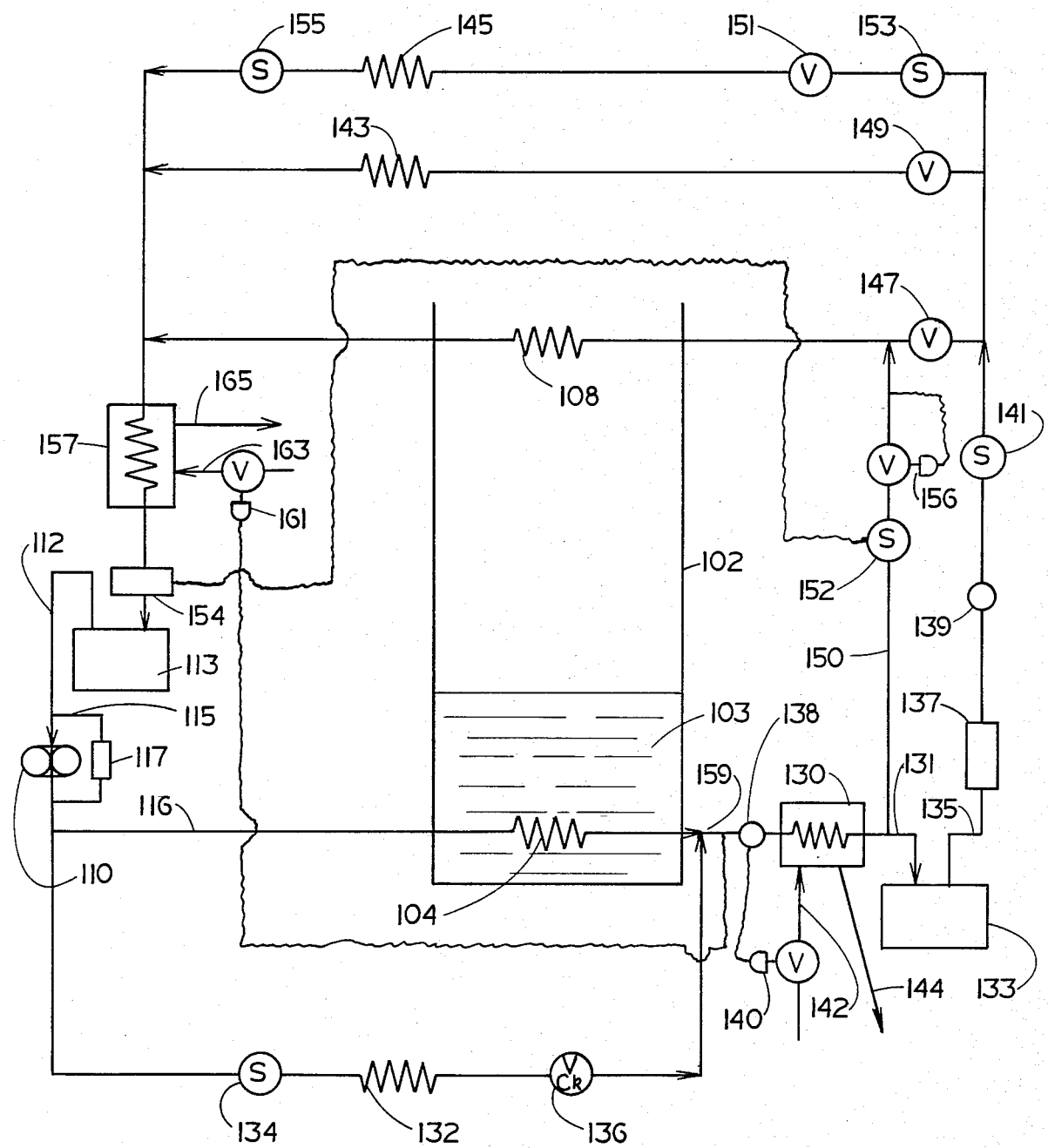
FIG. 3 is a schematic diagram of another preferred vapor generating and recovering apparatus of the present invention.

In the heating and cooling system of FIG. 3, shown schematically, a compressor 110, one of the types generally used in refrigerating systems, compresses a suitable refrigerant which flows to the compressor 110 in a refrigerant section conduit 112. Provided within conduit 112 is a suction accumulator 113 which regulates the flow of refrigerant to compressor 110. Suction accumulator 113 is utilized to provide gaseous refrigerant to compressor 110.

Compressor 110 compresses the suitable gaseous refrigerant, to a preselected pressure, and the pressurized hot refrigerant gas flows from the compressor 110 through conduit 116 to the heating coil 104, discussed previously, wherein the refrigerant is condensed therein and upon condensing vaporizes the liquid 103 which is disposed within container 102.

As with the systems of FIGS. 1 and 2, this system is also provided with the dual pressure control switch 117 at the compressor 110 and the pump down valve 141 between the main condenser or heating coil 104 and the cooling coil 108. The control switch 117 is operable in response to change in the pressure on each side of the compressor 110. Dual pressure control switch 117 is utilized during system pump down when the pump down valve 141 is closed and operates in response to low and high pressures developed by the refrigerant system to shut down the compressor 110 after the refrigerant has been pumped out of the cooling coil 108 and the compressor 110 as discussed above in regard to the systems of FIGS. 1 and 2.

In the systems of FIGS. 1 and 2, the main condenser, complementary condenser and refrigerant conduits were discussed as being physically sized to provide storage volume for the refrigerant pumped out of the cooling coil and compressor upon system pump down, the systems of FIGS. 3–7 can be provided with a refrigerant receiver 133 downstream of the main condenser 104 and complementary condenser 132 to provide storage volume for the refrigerant. It should be understood that the refrigerant receiver 133 can be used as the sole storage voluem for the refrigerant, or can be used in conjunction with a properly sized main condenser, complementary condenser or refrigerant conduits to store refrigerant upon system pump down.

In some devices, it is desired to utilize a plurality of heat emitting chambers and in this instance a plurality of condensing units 132 are utilized and disposed within vaporizing chambers or sub-chambers (not shown) generally similar to container 102. As shown, condensers 104 and 132 are in parallel and a solenoid valve 134 is provided to shut off refrigerant flow to the condenser 132 when the chamber(s) in which the condenser(s) 132 is utilized is not in use. Furthermore, a check valve 136 is provided to prevent back up of refrigerant into condenser 132 when not in use.

Also provided downstream of the parallel condensers 104 and 132 is a complementary condenser 130, complementary condenser 130 being utilized to remove excess heat from the boiling system. Complementary condenser 130 is operable in response to a pressure control device 138 in the line upstream of the condenser 130. Pressure control device 138 is actuated in response to a preselected pressure in the line upstream of complementary condenser 130 and in turn actuates and controls flow valve 140. Control flow valve 140 is disposed in the inlet water line 142 which feeds cooling water to the complementary condenser 130. An outlet water line 144 is provided for removing the heated water from the condenser 130.

Figure 4:
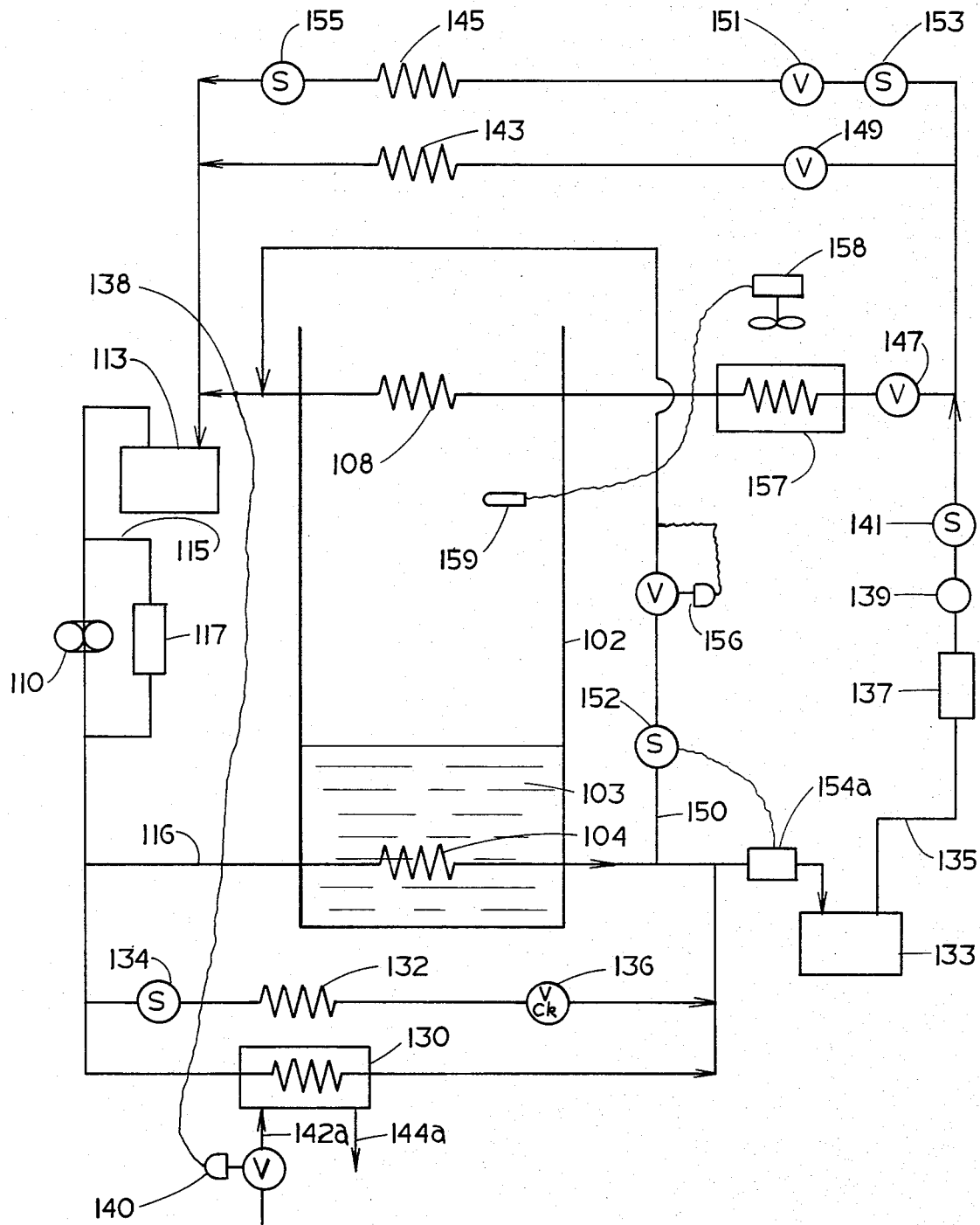
FIG. 4 is a schematic diagram showing one modification of the apparatus of FIG. 3.
Figure 5:
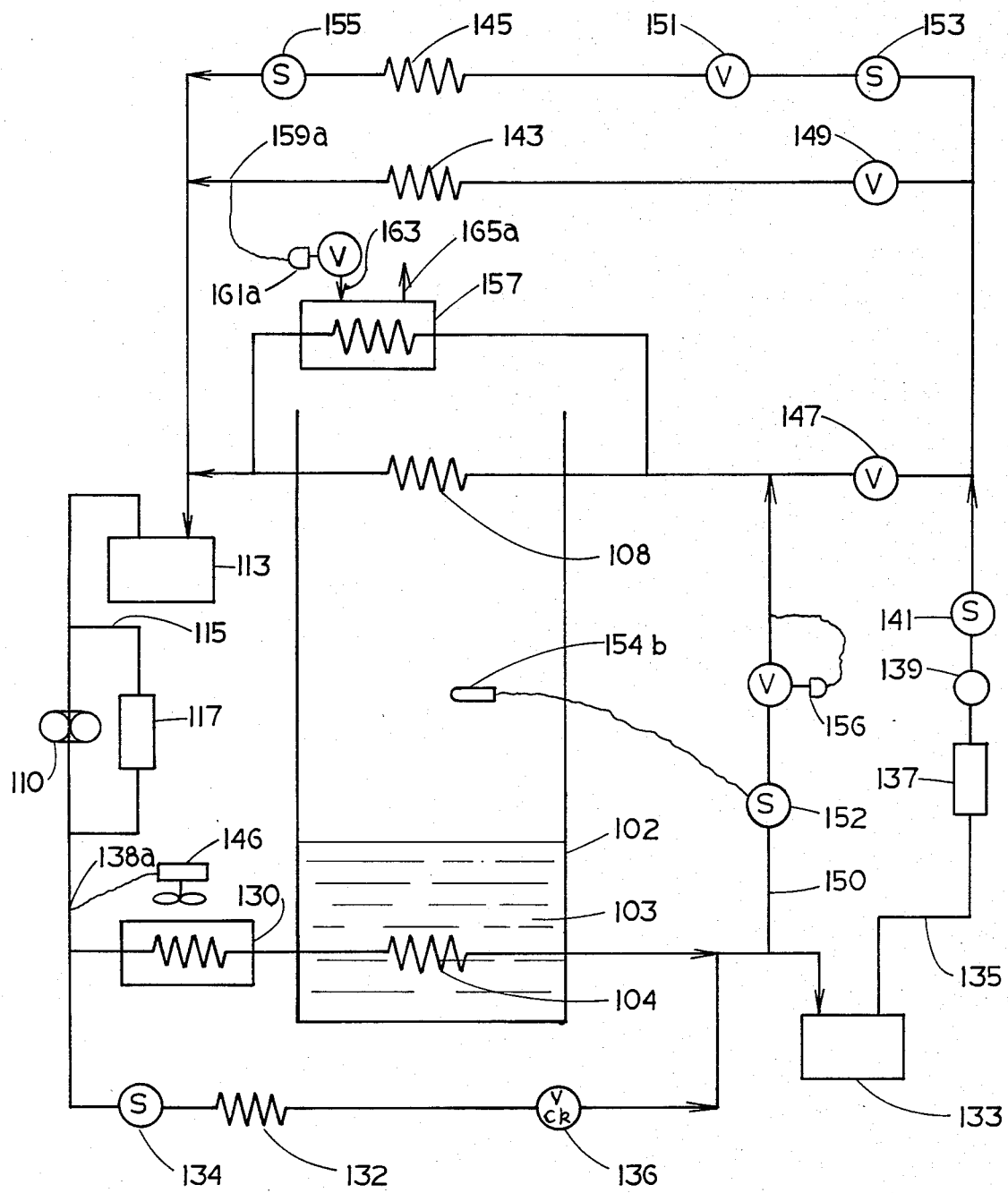
FIG. 5 is a schematic diagram showing another modification of the apparatus of FIG. 3.

It is realized that the complementary condenser 130 is shown as being in series with the main condenser 104, but it is realized that the complementary condenser 130 may also be in parallel with the main condenser 104 and the supplementary condenser 132 (FIG. 4). Furthermore, the complementary condenser 130 may be upstream of the main and supplementary condensers 104 and 132 (FIG. 5). Even further, the complementary condenser 130 may be air cooled (FIG. 5), refrigerant cooled (FIG. 4), and the like, as well as water cooled as shown in FIG. 3. In FIG. 4, refrigerant line 142a feeds cooling refrigerant to the complementary condenser 130 and an outlet line 144a is provided for removing the heated refrigerant from the condenser 130. In FIG. 5 a motorized blower 146 is provided to blow cooling air across the condenser 130. Also, the pressure control device 130 may be disposed on the high pressure side of the refrigeration system (FIG. 5), as represented by the numeral 138a as well as the pressure controls as shown in FIGS. 3 and 4.

The condensed or pressurized liquid refrigerant then flows through conduit 131 to the conventional liquid refrigerant receiver 133. From the liquid refrigerant receiver 133, the refrigerant flows by way of conduit 135 through a drier 137, a moisture indicator 139, the pump down solenoid valve 141, then through a plurality of thermoexpansion valves and direct expansion evaporating coils in parallel, each thermoexpansion valve being in series with an evaporating coil. Three evaporating coils 108, 143 and 145 with thermoexpansion valves 147, 149 and 151 respectively, are shown in the Figures. Evaporator coil 108 is the main or condensing evaporator, as discussed previously, and is disposed within container 102. Evaporating coil 143 is a convection control evaporator and evaporating coil 145 is a supplementary evaporator and is disposed within a condensing chamber or sub-chamber (not shown) generally similar to container 102. As shown, evaporators 108, 143 and 145 are in parallel and solenoid valves 153 and 155 are provided to shut off refrigerant flow to the supplementary evaporator(s) 145 when the chamber(s) in which the evaportor(s) 145 are disposed are not in use.

Also provided downwstream of the parallel evaporators 108, 143 and 145 is a complementary evaporator 157, complementary evaporator 157 being utilized to add heat to the system. Complementary evaporator 157 is operable, for example, in response to a pressure control device 159 in the line upstream of complementary condenser 130 and, in turn, actuates and controls flow valve 161. Control flow valve 161 is disposed in the inlet water line 163 which feeds relatively hot water to the complementary evaporator 157. An outlet water line 165 is provided for removing the cooled water from the evaporator 157.

It is realized that the complementary evaporator 157 is shown as being in series with one downwstream from the main evaporator 108 (FIG. 3), but it is realized that the complementary evaporator 157 may also be upstream of the main evaporator 108 (FIG. 4) as well as in parallel therewith (FIG. 5). Furthermore, the complementary evaporator 157 may be air heated (FIG. 4) as well as liquid heated as shown in FIG. 3. In FIG. 4, a motorized blower 148 is provided to blow heating air across the evaporator 157. Even further, the pressure control device 159 may be disposed on the high pressure side of the refrigeration system (FIG. 3) or on the low pressure side of the refrigeration system (FIG. 4). The complementary evaporator may be thermostatically controlled by the rise and fall of vapor temperature in the container 102 (FIG. 4), the temperature change in the low pressure side of the refrigeration system (not shown), or the temperature change on the high pressure side of the refrigeration system.

In FIG. 4, complementary evaporator 157 is disposed upstream of the parallel evaporators 108, 143 and 145 with the evaporator 157 being air heated by blower 158 which is operable in response to the temperature in the vapor zone of the container 102 as shown by numeral 159a. In FIG. 5, the complementary evaporator 157 is disposed in parallel with the parallel evaporators 108, 143 and 145; evaporator 157 being thermal fluid heated. Line 163a feeds heating fluid to the complementary evaporator 157 and outlet line 165a is provided for removing the cooled fluid from the evaporator 157. A control valve 161a is provided to control the flow of the heating fluid and is actuated in response to the pressure on the low pressure side of the system as shown by numeral 159a.

A by-pass conduit 150 is also provided to by-pass a part of the refrigerant. As shown in FIG. 3, the by-pass 150 is in series with the parallel condensers 104 and 132 and the evaporator 108. By-pass conduit 150 is in parallel with the main flow stream which passes through expansion valves 147, 149 and 151. Flow through conduit 150 is controlled by by-pass solenoid valve 152, which is actuated in response to pressure sensing device 154 which is actuated, in turn, in response to preselected pressure conductions in the flow stream leaving the complementary evaporator 157. A by-pass valve 156 is also provided and is operable for shutting off the flow through the by-pass 150 if the pressure of the refrigerant in the by-pass 150 exceeds a preselected pressure. It is also realized that the by-pass conduit 150 may enter the low pressure side of the refrigeration system after the evaporator 108 (FIG. 4). The by-pass system may be controlled by a manual control valve, a pressure actuated control valve in response to a preselected pressure condition on either the low pressure side (FIG. 3 as indicated by numeral 154) or the high pressure side (FIG. 4 as indicated by numeral 154a) of the system; or a thermostatic actuated control valve operable in response to the rise and fall of vapor temperatures in the container 102 (FIG. 5 as indicated by the numeral 154b) or a preselected temperature in either the low or high pressure side of the system at, for example, the points indicated by numerals 154 in FIG. 3 and 154a in FIG. 4, respectively.

Figure 6:
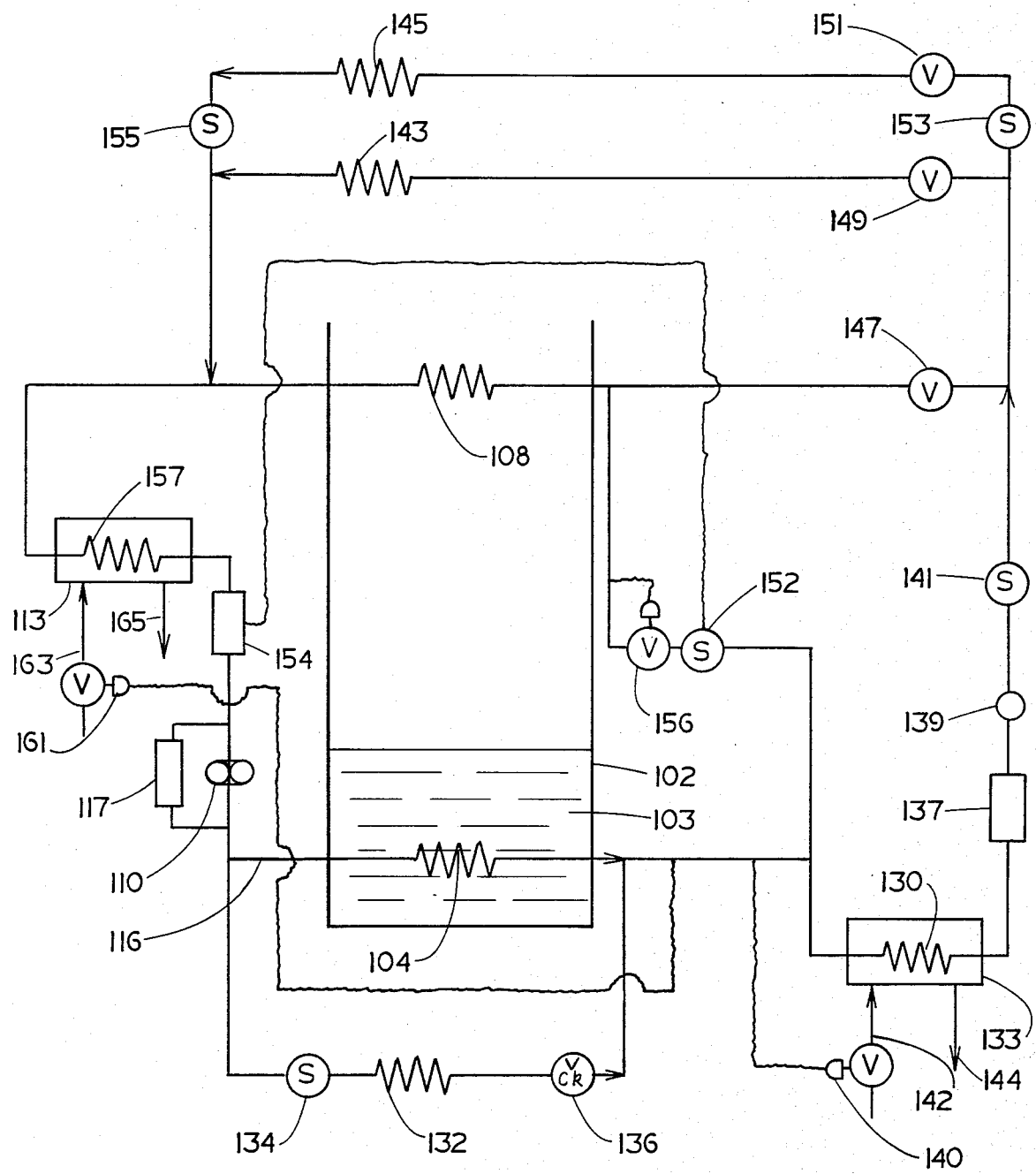
FIG. 6 is a schematic diagram showing even another modification of the apparatus of FIG. 3; and, FIG. 7 is a schematic diagram showing another modification of the apparatus of FIG. 3.

In FIG. 6, another embodiment of the present invention is shown wherein the liquid refrigerant receiver 133 includes the complementary condenser 130 therein and the suction accumulator 113 includes the complementary evaporator 157 therein.

Figure 7:
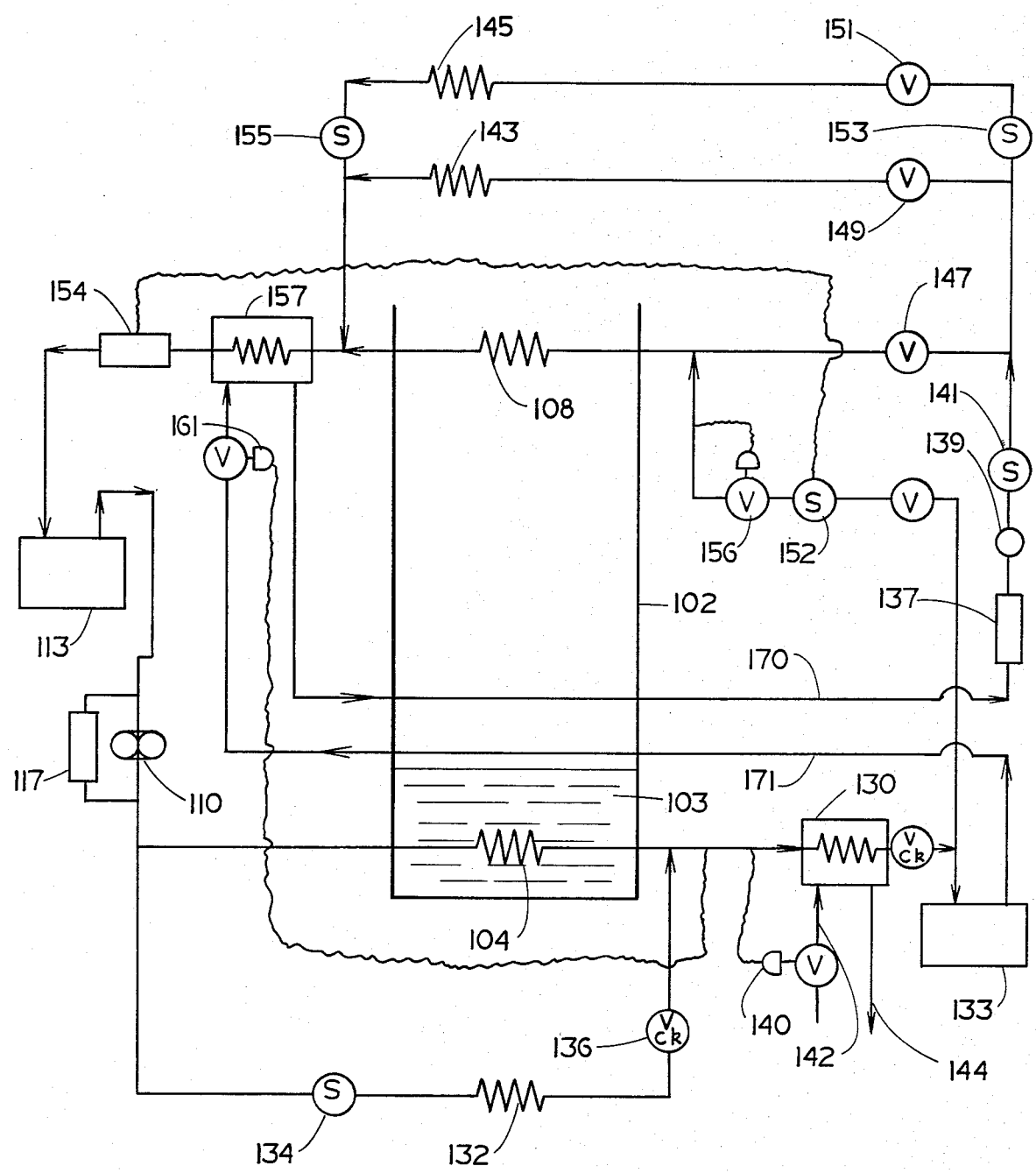

In FIG. 7, another embodiment of the present invention shows the liquid refrigerant being a thermal fluid to emit heat to the low pressure side of the system through the complementary evaporator as indicated by the numerals 170 and 171 for the conduits to and from the complementary evaporator 157. This provides additional capacity to the refrigeration system and assures superheated gas to the low pressure side of the compressor. Furthermore, this assures liquid to the expansion valves. Even further, a check valve 183 is incorporated in the system to prevent back-up of refrigerant to the compressor during pump down. In FIG. 7, the check valve 183 is disposed immediately downstream of the complementary condenser 130.

It will be realized that various other changes may be made to the specific embodiments shown and described without departing from the principles and spirit of the present invention.

What is claimed is:

1. In a vapor generating and recovery apparatus for vaporizing a liquid and condensing a vapor, including a housing comprising at least one compartment therein, said compartment having a liquid therein, the improvement comprising:
heating and cooling system in heat transfer relation with said liquid and said vapor in said compartment, said system including a main condenser in heat emitting relation with said liquid; a main evaporator in heat absorbing relation with said vapor; a complementary condenser in heat emitting relation in said system disposed outside said compartment; and, means to compress a refrigerant flowing in said system, said means to compress being in fluid communication on its high pressure side with said main condenser and said complementary condenser, and on its low pressure side with said main evaporator, said system including expansion means disposed between said main condenser and said main evaporator, pump down valve means therein disposed downstream of said main condenser and upstream of said main evaporator selectively closed prior to the shut down of the compressor and remains closed during system pump down while simultaneously said means to compress continues to operate for pumping refrigerant out of said compressor, and means to de-activate said means to compress at preselected refrigerant conditions said means to de-activate being operatively connected to said means to compress.

2. In the vapor generating and recovering apparatus of claim 1, said pump down valve means being disposed between said main condenser and said expansion means.

3. In the vapor generating and recovering apparatus of claim 2, including a check valve between said means to compress and said pump down valve means.

4. In the vapor generating and recovering apparatus of claim 1, said means to deactuate said means to compress includes low pressure sensing means at said means to compress.

5. In the vapor generating and recovering apparatus of claim 1, said means to deactuate said means to compress includes a dual pressure control switch.

6. In the vapor generating and recovering apparatus of claim 1, said complementary condenser is a water cooled condenser.

7. In the vapor generating and recovering apparatus of claim 1, said complementary condenser is an air cooled condenser.

8. In the vapor generating and recovering apparatus of claim 1, said complementary condenser is a refrigerant cooled condenser.

9. In the vapor generating and recovering apparatus of claim 1, said complementary condenser is a preselected pressure responsive actuated condenser in said system.

10. In the vapor generating and recovering apparatus of claim 1, said complementary condenser is a preselected temperature responsive actuated condenser in said system.

11. In the vapor generating and recovering apparatus of claim 1, said complementary condenser being in series with said main condenser.

12. In the vapor generating and recovering apparatus of claim 11, said complementary condenser being upstream of said main condenser.

13. In the vapor generating and recovering apparatus of claim 11, said complementary condenser being downstream of said main condenser.

14. In the vapor generating and recovering apparatus of claim 1, said complementary condenser being parallel with said main condenser.

15. In the vapor generating and recovering apparatus of claim 1 including a complementary evaporator in heat absorbing relation in said system disposed outside said compartment.

16. In the vapor generating and recovering apparatus of claim 15, said complementary evaporator is a water heated evaporator.

17. In the vapor generating and recovering apparatus of claim 15, said complementary evaporator is an air heated evaporator.

18. In the vapor generating and recovering apparatus of claim 15, said complementary evaporator is a thermal fluid heated evaporator.

19. In the vapor generating and recovering apparatus of claim 15, said complementary evaporator is a preselected pressure responsive actuated evaporator in said system.

20. In the vapor generating and recovering apparatus of claim 15, said complementary evaporator is a preselected temperature responsive actuated evaporator in said apparatus.

21. In the vapor generating and recovering apparatus of claim 15, said complementary evaporator being in series with said main evaporator.

22. In the vapor generating and recovering apparatus of claim 21, said complementary evaporator being upstream of said main evaporator.

23. In the vapor generating and recovering apparatus of claim 21, said complementary evaporator being downstream of said main evaporator.

24. In the vapor generating and recovering apparatus of claim 15, said complementary evaporator being parallel with said main evaporator.

25. In the vapor generating and recovering apparatus of claim 1 including a by-pass system from the high pressure side of said system to the low pressure side of said system.

26. In the vapor generating and recovering apparatus of claim 25, wherein said by-pass is in parallel with said main evaporator.

27. In the vapor generating and recovering apparatus of claim 25 wherein said by-pass is in series with said main evaporator.

28. In the vapor generating and recovering apparatus of claim 25, wherein said by-pass is a preselected pressure responsive actuated by-pass in said system.

29. In the vapor generating and recovering apparatus of claim 28 wherein said preselected pressure is on the low pressure side of said system.

30. In the vapor generating and recovering apparatus of claim 28, wherein said preselected pressure is on the high pressure side of said system.

31. In the vapor generating and recovering apparatus of claim 25 wherein said by-pass is actuated in response to a preselected temperature in said apparatus.

32. In the vapor generating and recovering apparatus of claim 31 wherein said preselected temperature is in said compartment.

33. In the vapor generating and recovering apparatus of claim 31 wherein said preselected temperature is in said low pressure side of said system.

34. In the vapor generating and recovering apparatus of claim 31 wherein said preselected temperature is in said high pressure side of said system.

35. In the vapor generating and recovering apparatus of claim 1 including a refrigerant receiver therein on the high pressure side of said system.

36. In the vapor generating and recovering apparatus of claim 35 including a check valve in said system between said refrigerant receiver and said means to compress.

37. In the vapor generating and recovering apparatus of claim 35 said refrigerant receiver and said complementary condenser being in heat transfer relation therewith.

38. In the vapor generating and recovering apparatus of claim 1 including a suction accumulator on the low pressure side of said system.

39. In the vapor generating and recovering apparatus of claim 38, said suction accumulator being in heat transfer relation with said complementary evaporator.

40. In the vapor generating and recovering apparatus of claim 1 including a heat transfer system in heat absorbing relation with said main condenser and in heat emitting relation with said liquid.

41. In the vapor generating and recovering apparatus of claim 1 including a heat transfer system in heat emitting relation with said main condenser and in heat absorbing relation with said vapor.

* * * * *